Oct. 3, 1961 F. J. SEHN ET AL 3,002,749
FEEDER FOR DELIVERING STOCK TO A MACHINE
Filed July 16, 1958 5 Sheets-Sheet 5
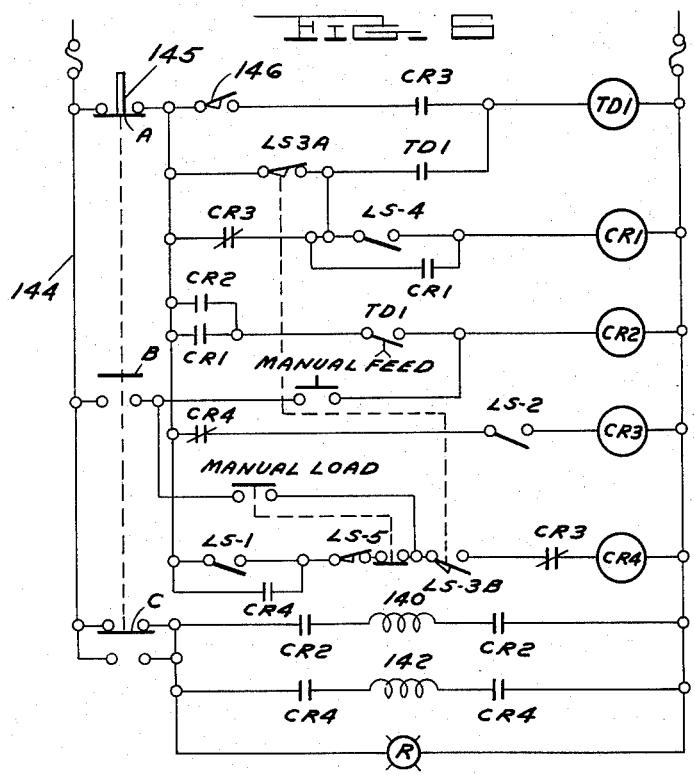
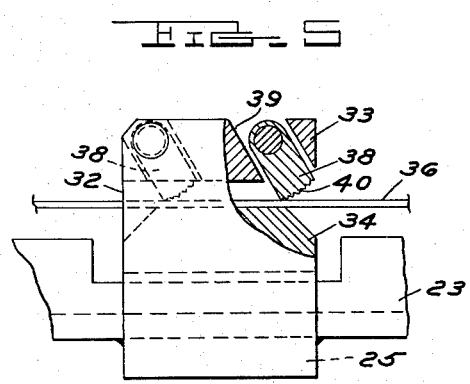
INVENTORS
FRANCIS J. SEHN
MAURICE M. CLEMONS
BY
Farley, Forster & Farley
ATTORNEYS

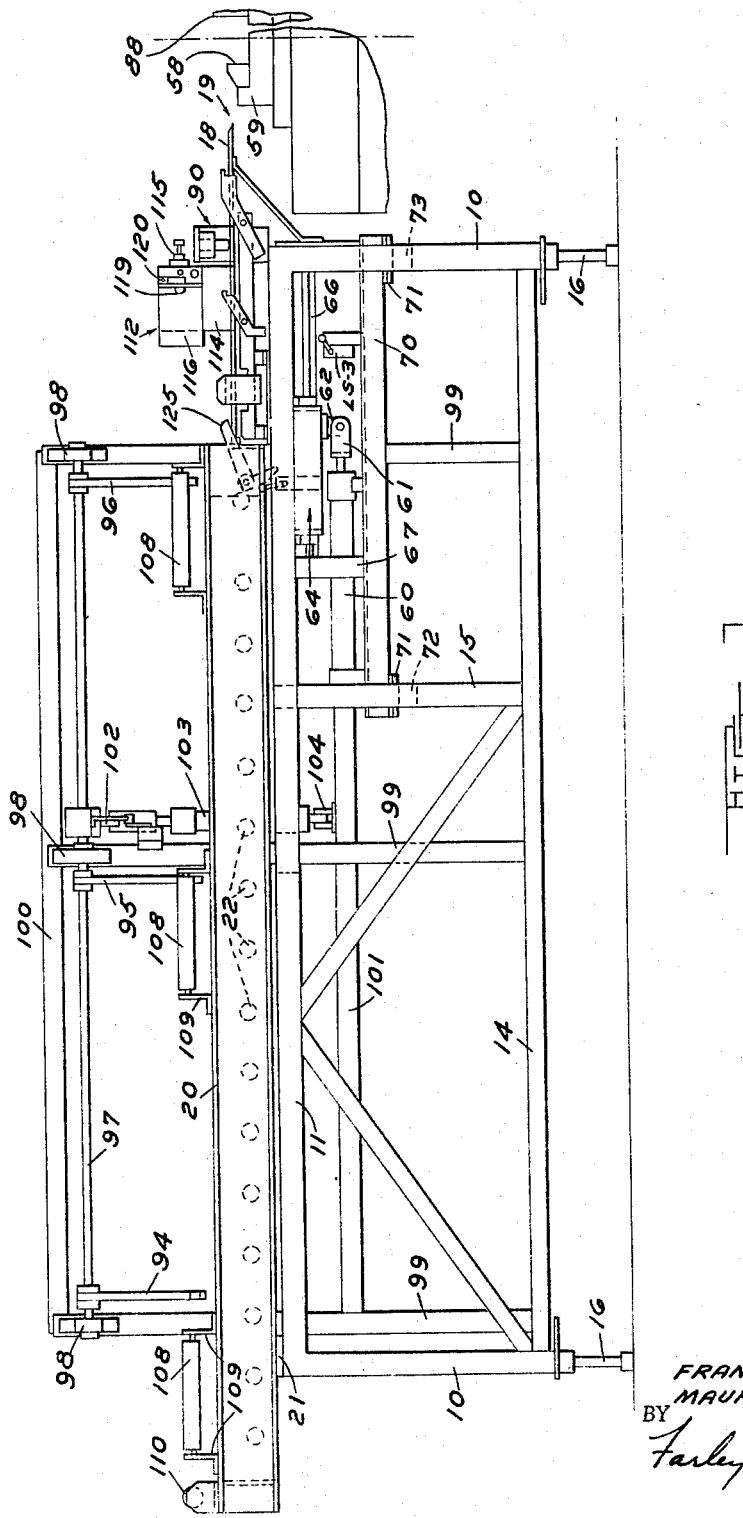

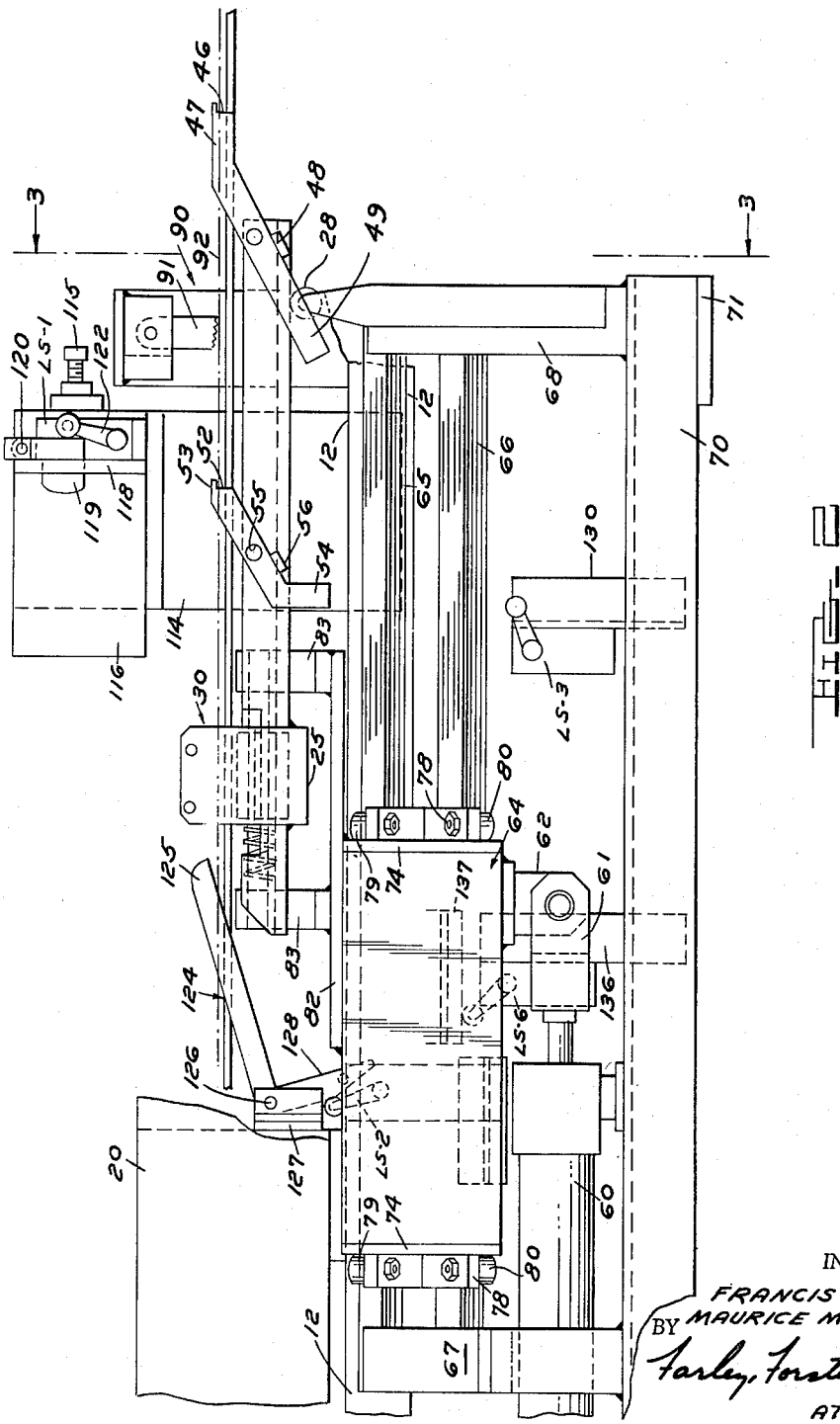

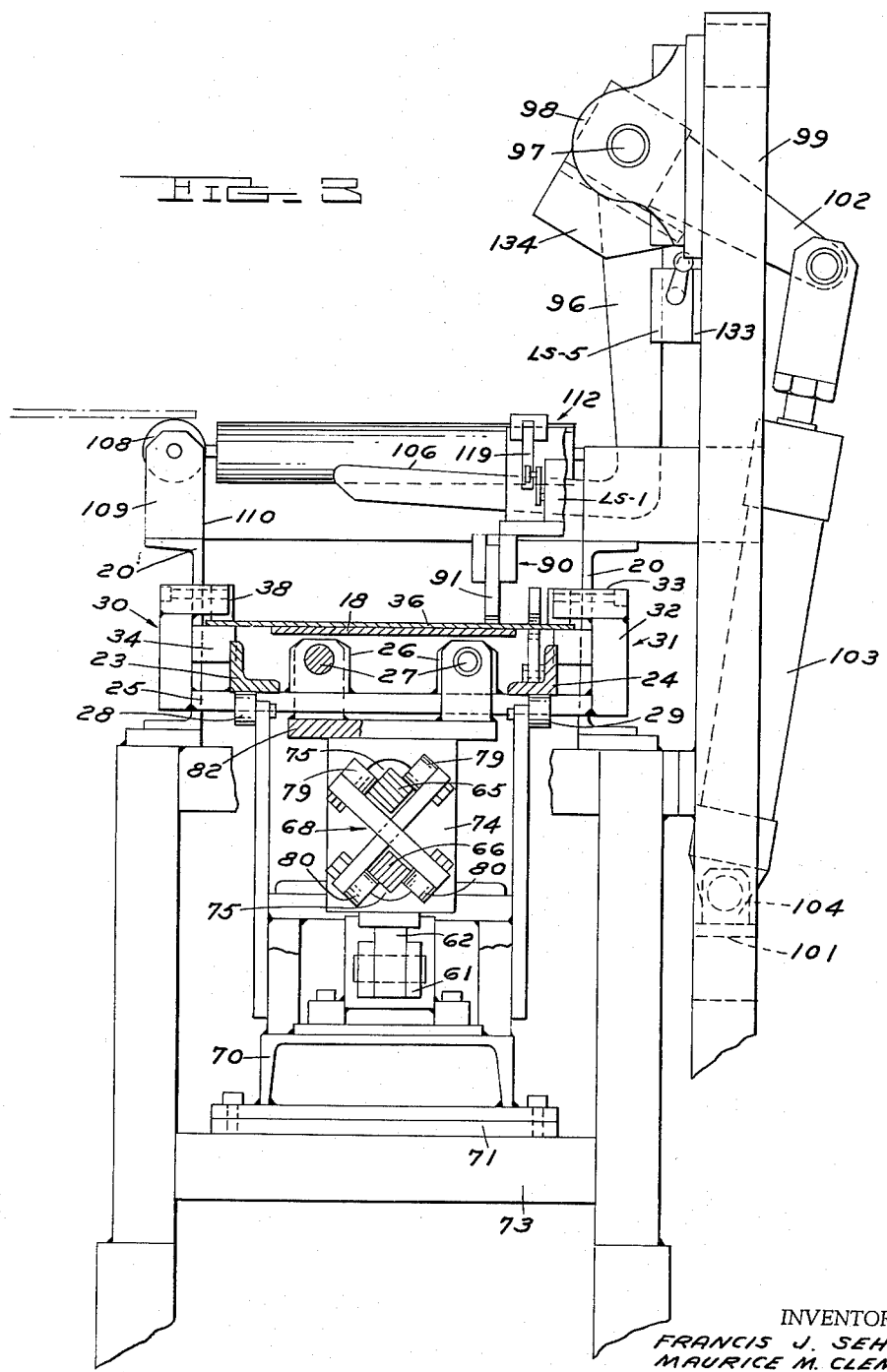

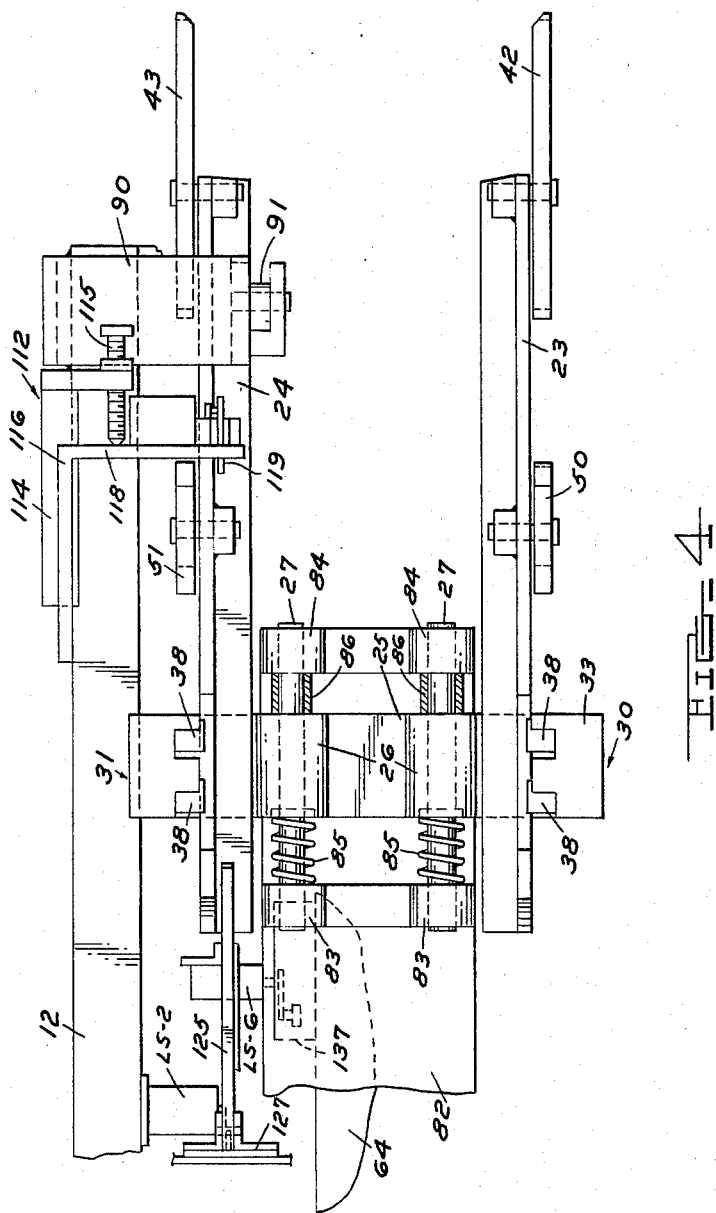

United States Patent Office 3,002,749
Patented Oct. 3, 1961

3,002,749
FEEDER FOR DELIVERING STOCK TO A MACHINE
Francis J. Sehn, 3515 Brookside Drive, Bloomfield Hills, Mich., and Maurice M. Clemons, Birmingham, Mich.; said Clemons assignor to said Sehn
Filed July 16, 1958, Ser. No. 748,952
12 Claims. (Cl. 271—54)

This invention relates to improvements in the construction and operation of a feeder for delivering strip stock to a machine whose cycle of operation includes the severing of a workpiece length from the strip. The invention has particular utility in the feeding of strips of sheet metal to a press, and will be illustrated and described in this use. However, in view of other possible applications of the invention, the term "strip" is intended to broadly designate a piece of stock of any type which is long enough so that a plurality of workpiece lengths can be severed therefrom by the machine to which it is fed.

The general object of the invention is to provide a feeder which will permit uninterrupted operation of the machine on successive cycles by automatically delivering strip to the machine at the required rate and in uniform workpiece lengths.

The improved feeder consists generally of a frame including a bed on which a strip is supported for movement toward the discharge end of the feeder and into the machine. A carriage mounted on the frame adjacent the bed is reciprocated from a normal position on a feed and a return stroke by suitable actuating means such as a fluid pressure cylinder. On each feed stroke, the strip is engaged by one-way gripping means mounted on the carriage and the leading end of the strip is advanced from the discharge end of the feeder into the machine. The machine then performs its intended operation and severs a workpiece length from the strip while the carriage is returning to normal position. Preferably, a holdback device is mounted on the feeder frame and engages the strip during return movement of the carriage. The feed stroke of the carriage is equal to the workpiece length which is less than the feed stroke of the carriage actuating means. Workpiece length is determined by contact between the leading end of the strip and a stop in the machine on the carriage feed stroke, and a lost motion connection is used between the carriage and its actuating means, thereby insuring the delivery of a true workpiece length of material to the machine on each feeding operation.

Continuous automatic operation is obtained by the provision of loading means for holding a second strip adjacent the feeder bed in a loading position, these loading means being operable to deposit such second strip on the feeder bed when actuated. Actuation of the loading means takes place in response to the passage of the trailing end of the strip being fed beyond a point on the feeder bed which is slightly in advance of the leading end of a second strip held by the loading means in a loading position.

The loading position of a second strip is such as to place its leading end in advance of the position of the strip gripping means when the carriage is in normal position, and actuation of the loading means is also made to occur after the feed carriage has been moved on its feed stroke and the gripping means have advanced beyond the leading edge of the second strip. Sensing means are also provided for making actuation of the loading means occur in response to the presence of a second strip on the loading means in correct loading position.

Operation of the loading means deposits a second strip on the feeder bed in a position where the distance separating the leading end of the second strip just loaded and the trailing end of the strip being fed is within the limits of overtravel of the feed carriage actuating means relative to the feed stroke of the carriage. Thus, on the next feed stroke of the carriage, the second strip is engaged thereby and its leading end is advanced into contact with the trailing end of the preceding strip, imparting feeding movement to such preceding strip and advancing it into the machine a workpiece length.

Preferably means are also included in the construction of the feed carriage for engaging the trailing end of a strip being fed in the event a second strip is not loaded onto the machine bed. The arrangement is such that this type of feeding action is rendered inoperative by a second strip.

Suitable controls are incorporated for correlating the operation of the feeder with the machine cycle, and to safeguard against malfunction either of the feeder or its operator.

A representative of embodiment of the invention, illustrating the application of the principles of the invention for delivering sheet strip to a press, is disclosed in the accompanying drawings having the following views:

FIGURE 1 is a side elevation of the feeder including a schematic showing of the die of a press to which the feeder is delivering strips;

FIGURE 2 is an enlarged side elevation of the discharge end portion of the feeder shown in FIGURE 1;

FIGURE 3 is a modified sectional elevation taken through the discharge end of the feeder on line 3—3 of FIGURE 2;

FIGURE 4 is a fragmentary plan view of the discharge end of the machine showing the feed carriage;

FIGURE 5 is an enlarged elevation, partly in section, of the strip gripping means mounted on the carriage for advancing the strip on a feed stroke; and FIGURE 6 is a schematic diagram of a representative control circuit for the feeder.

Referring to FIGURES 1, 2 and 3, the main components of the machine include a frame, a strip supporting bed, a feed carriage, feed carriage actuating means, and loading means.

The frame includes corner uprights 10, upper and lower longitudinal side members 11, 12, 13, and 14, and intermediate uprights 15. Leveling devices 16 are mounted on each of the corner uprights 10 for adjusting the frame height.

The bed is composed of a bed plate 18 at the discharge end 19 of the machine, and a roller section consisting of a pair of laterally spaced channel members 20 which are mounted on pads 21 carried by the upper longitudinal frame members 11 and 12. A series of rollers 22 are rotatably carried between the channel members 20 and form an extension of the bed plate 18. Channel members 20 extend an appreciable distance above the level of the roller bed and act as guides for a strip supported thereon.

The feed carriage, shown in plan in FIGURE 4, consists of a pair of angle members 23 and 24, located to either side of and below the bed plate 18 (FIGURE 3), and connected to a transverse plate 25 which extends below and to either side of the angle members. A pair of bearings 26 are mounted on the plate 25 intermediate the angle members 23 and 24, and bearings 26 each slidably engage a guide rod 27. Guide rods 27 support one end of the feed carriage and form part of the structure of an actuating carriage, hereinafter described. A pair of fixed rollers 28 and 29 (FIGURES 2 and 3) support the feed carriage angle members 23 and 24 adjacent the discharge end of the feeder.

A strip engaging or gripping device is mounted on each end of the feed carriage cross plate 25. These gripping devices are indicated generally by the references 30 and 31 and are best shown in FIGURES 3 and 5. Each gripping device consists of an angle bracket having vertical and horizontal portions 32 and 33, a wear block 34 carried by the vertical portion 32 in position so that its upper surface is positioned at or slightly above the lever of the upper surface of the bed plate 18 for engagement with the lower surface of a strip 36, and a pair of gripper dogs 38 each mounted for limited pivotal movement in a slot 39 in the horizontal portion 33. Each gripper dog is formed with a serrated gripping edge 40 which engages the upper edge of the strip, clamping the strip against the wear block during feeding movement of the carriage.

The feed carriage also includes two pair of pusher dogs. One pair of these pusher dogs 42 and 43 are pivotally secured to the carriage side members 23 and 24 at the discharge end thereof. Pusher dogs 42 and 43 each include a driving face 46 (FIG. 2) and a control face 47, with each of these pusher dogs being normally urged to a driving position against a stop 48 by the weight of its tailpiece 49.

The second pair of pusher dogs 50 and 51 are located intermediate the end pushers 42 and 43 and the strip grippers 30 and 31. These intermediate dogs also have a driving face 52, a control face 53 and a tailpiece 54 which normally moves each dog about its pivot pin 55 into a driving position as defined by a stop 56.

End pushers 42 and 43, and intermediate pushers 50 and 51 are also positioned so that the distance between their respective driving faces 46 and 52 is equal to the length of a workpiece, and, the feeder is positioned relative to the machine (FIG. 1) so that the distance between the driving faces 46 of end pushers 42 and 43 and the cutting surface 58 of the die 59 is equal to the length of a workpiece.

Actuating mechanism for the feed carriage includes a fluid pressure cylinder 60 (FIGS. 1 and 2) having a piston rod with a clevis fitting 61 which is pinned to the tongue 62 of an actuating carriage, generally designated 64. Carriage 64 is mounted for reciprocating movement on a pair of vertically spaced tracks 65 and 66, each of square cross section, which are supported at their ends between pairs of vertical brackets 67 and 68 connected to and extending upwardly from a base channel 70 whose ends rest upon pads 71 supported by intermediate frame cross members 72 and 73 (FIG. 1).

Carriage 64 is a box-section weldment including end plates 74 each provided with a pair of pie shaped apertures 75 (FIG. 3) for clearance with the upper and lower tracks 65 and 66. An X-shaped mounting bracket 78 is secured to the outer face of each end plate 74. Two pair of rollers are carried by each of the mounting brackets 78, a pair of upper rollers 79 which support the carriage on the upper track 65, and a pair of lower rollers 80 which guide the carriage on the lower track 66.

A feed carriage supporting plate 82 is secured to the upper portion of the carriage 64 (FIG. 2), projects forwardly thereof, and carries two pair of upwardly projecting brackets 83, each pair supporting one of the guide rods 27. Thus, the rear end of the feed carriage is supported by the tracks 65, 66 through the actuating carriage.

Motion of the actuating carriage is transmitted to the feed carriage by a pair of springs, 85 (FIG. 4), one of which is mounted on each of the guide rods 27 and is interposed between a bracket 83 and a bearing 26 of the feed carriage. These springs 85 provide a lost motion connection between the actuating carriage and the feed carriage, permitting the use of a feed stroke for the actuating carriage which exceeds the length of the feed stroke of the feed carriage, and incidentally serves to impart a more gradual initial movement to the strip.

The feed stroke of the feed carriage is equal to the length of a workpiece which is determined by contact between the leading edge of the strip and a stop 88 (FIG. 1) on the machine. The feeder is positioned relative to the machine so that the workpiece length is less than the feed stroke of the actuating carriage within the limit of overtravel provided by the lost motion connection.

Return stroke movement is transmitted to the feed carriage through sleeves 86 (FIG. 4) mounted on the guide rods 27 between the brackets 84 of the actuating carriage and the feed carriage bearings 26. During return movement, the strip is held in position by a holdback device 90, which is an angle bracket member connected to and extending upwardly from frame member 12. A holdback dog 91 is pivotally carried by bracket 90 and has a downwardly projecting serrated edge 92 (FIG. 2) which is shaped to wedge the strip against the surface of the bed plate 18 upon the slightest degree of return movement of the strip.

The loading means for depositing a second strip on the feeder bed consists of three arms 94, 95 and 96 (FIG. 1) each mounted on a common shaft 97 for oscillation therewith. Shaft 97 is supported in bearings 98, each bearing being carried by a vertically extending frame member 99, these frame members being interconnected by upper and lower horizontal members 100 and 101. A crank 102 is also fixed on the shaft 97 and is connected to an actuating cylinder assembly 103, supported at 104 on frame member 101.

Each of the arms 94, 95 and 96 includes a strip supporting portion 106 (FIG. 3) which extends substantially horizontally when the arms are in normal position as shown in FIGURE 3. A series of side loading rollers 108 are each supported between pairs of brackets 109 on the upper flange of a roller bed side member 20 for the convenience of an operator in placing a second strip on the surfaces 106 of the arms 96. The inner edge 110 of brackets 109 forms an extension of the guide surface formed by side member 20 (FIG. 3). An end loading roller 111 (FIG. 1) is also provided to assist in the loading operations if carried on from this direction.

A loading gauge assembly 112 defines the loading position of a second strip mounted on the arms 94—96. This gauge, best shown in FIGURES 2 and 4, comprises a mounting bracket 114 carried by frame side member 12 and provided with an adjusting screw 115. A gauge member 116, having a gauge surface 118, is adjustably secured to the mounting bracket 114. An indicating member 119 is pivotally secured at 120 to gauge member 116 and projects through a slot in the gauge surface 118. Indicating member 119 is moved about its pivot upon being contacted by the leading end of a second strip brought into registry with the gauge surface 118, and when so moved, it operates the actuating arm 122 of a limit switch LS1. Limit switch LS1 thus senses the presence of a second strip on the loading means in a proper loading position.

Other limit switches for controlling the operation of the feeder are as follows:

Limit switch LS2 (FIGS. 2 and 4), which is mounted on the frame side member 12 (FIG. 4), and is actuated by a bellcrank 124 having one arm 125 which normally projects above the level of the upper surface of the bed plate to one side thereof, as shown in FIGURE 4. This bellcrank is pivotally mounted at 126 on a bracket 127 carried by the bed structure, and its other arm 128 operates the actuating arm of LS2;

Limit switch LS3 (FIGS. 1 and 2), which is carried by an angle bracket 130 mounted on the bed channel 70 in position to be contacted by the actuating carriage at the end of its feed stroke;

Limit switch LS4 (shown schematically only in FIG. 6), which is mounted on the machine in position to be contacted by a workpiece leaving the die 59 (FIG. 1). LS4 thus comprises part of the means for interlocking operation of the feeder with the operation of the machine, or in other words, part of the means for sensing that the machine is ready for another feeding operation;

LS5 (FIG. 3), which is supported by a bracket 133 mounted on the upright frame member 99 of the loading means so as to place its actuating arm position to be contacted by a cam 134 carried by the crank 102, when crank 102 is actuated to move the loading arms to unloaded position; and LS6 (FIG. 2), which is mounted on a bracket 136 carried by channel member 70 in position so that its actuating arm is contacted by a cam 137 on the actuating carriage 64 when this carriage has been returned to normal position.

These limit switches operate as follows:

LS1 is normally open. Its contact is held closed by the presence of a strip on the loading arms in proper loading position.

LS2 is normally open. Its contact is held closed by a strip on the bed plate 18, and opens after the trailing end of such strip has advanced out of contact with the bellcrank arm 125.

LS3 operates two contacts, LS3a and LS3b (FIG. 6). LS3a is normally closed and LS3b is normally open. The position of these contacts is reversed when the actuating carriage reaches the end of its feed stroke and engages the actuating arm of LS3.

LS4 is normally open. It is closed by the ejection of a formed piece from the die 59 of the press.

LS5 is normally closed. It is opened by movement of the crank 102 of the loading mechanism to load depositing position.

LS6 is normally open. It is closed when the actuating carriage is returned to normal position.

In the circuit diagram (FIG. 6), the limit switch contacts are all shown in the normal position above mentioned as are the contacts of the various control relays designated TA1, CR1, CR2, CR3 and CR4. These relay contacts are indicated by the designation of the relay which controls each. Actuating carriage cylinder 60 and loading means cylinder 103 are respectively controlled by solenoid valves 140 and 142, and the operation of these valves is controlled either automatically or manually by the circuit of FIGURE 6.

This circuit is connected to a power line 144 through a switch 145 having three positions—automatic, off and manual—automatic position being shown. Switch 145 has three contacts A, B and C, A and C being closed in automatic position, B and C being closed in manual position, and all being open in off position. In automatic position, operation of the feeder is interlocked with press operation by a switch 146 which is actuated by suitable means on the press. This switch is closed when the press is ready to begin a new cycle.

Since the circuit of FIGURE 6 follows normal electrical practice, it will be described in terms of the operation of the feeder and the circuit components, rather than in detail. With switch 145 in the automatic position shown, feed cylinder control solenoid 140 is energized to move the feed carriage on a feed stroke by CR2, provided: (a) there is strip on the bed of the feeder (energizing CR3); (b) the press is in condition to receive strip, as determined by the closing of LS4 upon the ejection of a previous workpiece from the die to energize CR1; and, (c) the press has completed its cycle to close switch 146 and energize relay TD1.

When the piston of feed cylinder 60 reaches the end of its feed stroke, LS3 is engaged, opening the contact LS3a and de-energizing relays TD1 and CR2 and cylinder control solenoid 140. This results in feed cylinder 60 being actuated on its return stroke.

Operation of the solenoid 142 which controls the load cylinder 103 takes place in response to: (a) the presence of a second strip on the loading arms in a loading position to hold LS1 contact closed; (b) the passage of the trailing end of the strip being fed off of bellcrank arm 125 to open LS2 contact and de-energize control relay CR3; and (c) movement of the feed carriage to the end of its feed stroke, to actuate LS3 and close contact LS3b. When the above conditions are all met, relay CR4 is energized to produce movement of the piston of load cylinder 103 on a driving stroke. Counter-clockwise movement of the loading arms takes place (as the parts are shown in FIGURE 3) and the strip supported on the arm portions 106 slides leftwardly and downwardly onto the roller bed of the feeder between the guides formed by the beams 20.

LS5 contact is opened when loading movement of the loading mechanism has taken place, and this de-energizes control relay CR4 to produce a reverse movement of the piston of cylinder 103.

As previously explained, the feeder delivers an exact workpiece length of stock to the machine on each feeding stroke. Therefore, strips of stock used in the feeder are trimmed to a multiple of the workpiece length. Positioning of the end pushers 42 and 43, the intermediate pushers 50 and 51, and the bellcrank 124 is also a function of workpiece length. The feeder itself is located so that the driving faces 46 of the end pushers 42 and 43 are a workpiece length from the edge 58 of the die, and the spacing between these driving faces 46 and the driving faces 52 of the intermediate pushers 50 and 51, and between these driving faces 52 and the end of the bellcrank arm 125 is in each case approximately equal to a workpiece length.

A strip on the feeder bed is advanced in workpiece length increments of travel until the trailing end of the strip reaches a position where it is in contact with the end of the bellcrank arm 125. On the next feed stroke of the feed carriage the strip will be advanced to a position where its trailing end has passed just beyond the control faces 53 of the intermediate pushers 50 and 51, and has passed just beyond vertical alignment with the gauge surface 118 (see FIG. 2).

If a second trip is supported on the loader arms in proper loading position, i.e. with its leading end in contact with gauge surface 118, this second strip will be deposited on the feeder bed at this stage of the feeder operation. In other words, depositing of the second strip takes place when the feed carriage is at the end of its feed stroke on which the trailing end of the strip being fed has been advanced to a position just beyond the end of the control faces 53 of the intermediate pushers 50 and 51, and just beyond a position of vertical alignment with gauge surface 118. Pushers 50 and 51 move to a driving position and are moved back to an inoperative position when contacted by the under-surface of a second strip deposited on the feeder bed.

The feed carriage then returns to its normal position and the grippers are brought into a position for engagement with the second strip. On the next feed stroke the grippers impart movement to the second strip which is first advanced into contact with the trailing end of the preceding strip and feeding movement is then imparted from the second strip to the preceding strip. The clearance between the leading end of the second strip and the trailing end of the preceding strip will be within the limits of overtravel between the feed and actuating carriages.

In the event a second strip is not loaded on the bed, automatic cycling of the feeder ceases when the trailing end of the strip being fed is advanced out of contact with arm 125, thus opening LS2. CR3 is de-energized making it impossible to energize relay TD1. The length of strip then remaining on the bed plate 18 can be fed to the machine by cycling the feeder manually. This is done by moving the switch 145 to the manual position and energizing relay CR2 through the manual feed button which is then connected to the power line 144 through contact B of switch 145.

In the machine shown, two workpiece lengths will be left on the strip when automatic operation ceases due to the absence of a second strip on the loader arms. The first of these increments is fed to the machine by engagement between the trailing end of the strip and the driving faces 52 of the intermediate pusher dogs 50 and 51. The last increment is similarly fed by engagement between the trailing end of the strip and the driving faces 46 of the leading pusher dogs 42 and 43.

Manual operation of the loading means is also possible through the manual load pushbutton, but, as can be seen from FIGURE 6, energization of control relay CR4 to actuate the load cylinder solenoid 142 will not take place unless the feed carriage is at the end of its feed stroke to close contact LS3b and control relay CR3 is de-energized (by an open LS2 contact) to indicate that there is no strip on the table and in interfering position with the strip to be loaded.

It is recognized that changes from the particular feeder construction shown may and will be made to adapt the invention for use with particular machines and particular types of strip or stock being fed to such machine. Such changes and modifications as are within the scope of the following claims are to be considered a part of the present invention.

We claim:

1. A feeder for delivering strip material to a machine of a type whose cycle of operation includes the severing of a workpiece from the strip, with the strip having a length which is approximately an even multiple of the length of the workpiece; comprising a frame, bed means carried by said frame for slidably supporting a strip, a carriage mounted on said frame for reciprocal movement lengthwise of said bed, actuating means for reciprocating said carriage from and to a normal position on a feed and a return stroke, means connecting said carriage to said actuating means, strip engaging means carried by said carriage and operable to engage a bed-supported strip intermediate the ends thereof on each feed stroke, said strip engaging means being inoperable on each return stroke, loading means for holding a second strip adjacent said bed in a loading position, gauge means defining said loading position so as to place the leading end of said second strip in advance of the location of said strip engaging means when said carriage is in said normal position, and means for actuating said loading means to deposit said second strip along said bed in response to movement of the trailing end of a preceding strip beyond said loading position.

2. A feeder according to claim 1 further characterized by said means for actuating said loading means including means responsive to the presence of said second strip on said loading means in said loading position.

3. A feeder according to claim 1 wherein said means for actuating said loading means includes a pair of sensing elements mounted on said frame, one of said sensing elements being responsive to movement of the trailing end of a strip beyond a point on said bed which is slightly less than the length of a workpiece from the leading end of a second strip carried by said loading means in a loading position, and the second of said sensing elements being responsive to movement of said carriage to the end of a feed stroke.

4. A feeder according to claim 1 wherein said loading means comprises strip supporting means, means movably mounting said supporting means on said frame in laterally and upwardly spaced relation to said bed, and means for actuating said loading means producing a movement of said supporting means such as to deposit said second strip on said bed by gravity.

5. A feeder according to claim 1 further characterized by said means for connecting said actuating means to said carriage including a resilient member for transmitting feeding movement of said actuating means to said carriage whereby the feed stroke of said actuating means can exceed the feed stroke of said carriage to the extent of the compression of said resilient member.

6. A feeder according to claim 1 further characterized by said carriage being provided with at least one strip pusher, said pusher having a driving face adapted to engage the trailing end of a strip, means mounting said pusher on said carriage at a location intermediate the location of said strip engaging means and the discharge end of said bed.

7. A feeder according to claim 1 further characterized by said carriage being provided with at least one strip pusher, said pusher having a driving face adapted to engage the trailing end of a strip and a control face adapted to be engaged by a longitudinal surface of said strip to hold said driving face in an inoperative position, means for normally urging said pusher to a driving position, and means mounting said pusher on said carriage at a location intermediate the location of said strip engaging means and the discharge end of said bed whereby said pusher moves to drive position to impart a feed stroke to said strip after movement of the trailing end of said strip past said strip engaging means, said pusher control face being contacted by a second strip upon the deposit of said second strip on said bed, thereby rendering said pusher inoperative and causing feeding movement to be imparted to the trailing end of said strip by the leading end of said second strip.

8. A feeder for delivering strip material to a machine of a type whose cycle of operation includes the severing of a workpiece from the strip, with the strip having a length which is approximately an even multiple of the length of the workpiece; comprising a frame, bed means carried by said frame for supporting a strip for movement toward the discharge end of said feeder, a feed carriage mounted on said frame adjacent said discharge end for reciprocal movement lengthwise of said bed, actuating means for reciprocating said carriage from and to a normal position on feed and return strokes, strip gripping means carried by said carriage for engagement with a longitudinal surface of a bed-supported strip intermediate the ends thereof on each feed stroke of said carriage, said strip gripping means comprising a member carried by said carriage for contact with one surface of said strip, a gripper dog, and means pivotally mounting said gripper dog for contact with a second surface of said strip opposite the surface contacted by said member, said gripper dog having a gripping surface disposed for wedging engagement with said second strip surface whereby said gripper dog is pivotally moved into such wedging engagement in response to movement of said feed carriage on a feed stroke and pivotally moved to release such wedging engagement in response to movement of said feed carriage on a return stroke.

9. A feeder according to claim 8 further characterized by the provision of holdback dog, means for mounting said holdback dog on said feeder frame in position for engagement with a surface of said strip opposite the surface supported on a portion of said bed means, said holdback dog having a strip gripping portion disposed for wedging engagement with the surface of said strip in response to movement of said feed carriage on a return stroke.

10. A feeder according to claim 9 wherein said gripping means are located a distance greater than one workpiece length from the end of said feed carriage, and strip pusher means carried by said feed carriage intermediate said gripping means and the end of said feed carriage, said pusher means having a driving face adapted to engage the trailing end of a strip when advanced beyond the location of said pusher means.

11. A feeder according to claim 10 wherein said holdback dog is located intermediate the location of said gripping means and the end of said feed carriage, said holdback dog being spaced from said gripping means a distance approximately equal to a workpiece length.

12. A feeder for delivering a continuous strip of material to a machine of a type whose cycle of operation includes the severing of a workpiece from the strip, comprising a frame, bed means carried by said frame for supporting a strip for movement toward the discharge end of said feeder, a feed carriage mounted on said frame adjacent said discharge end for reciprocal movement lengthwise of said bed, actuating means for reciprocating said carriage from and to a normal position on feed and return strokes, strip gripping means carried by said carriage for engagement with a longitudinal surface of a bed-supported strip intermediate the ends thereof on each feed stroke of said carriage, said strip gripping means comprising a member carried by said carriage for contact with one surface of said strip, a gripper dog, and means pivotally mounting said gripper dog for contact with a second surface of said strip opposite the surface contacted by said member, said gripper dog having a gripping surface disposed for wedging engagement with said second strip surface whereby said gripper dog is pivotally moved into such wedging engagement in response to movement of said feed carriage on a feed stroke and pivotally moved to release such wedging engagement in response to movement of said feed carriage on a return stroke, stop means for engagement by said strip on each feed stroke, said stop means defining a workpiece length less than the feed stroke of said actuating means, and lost motion connecting means interposed between said actuating means and said carriage.

References Cited in the file of this patent

UNITED STATES PATENTS

| | | |
|---|---|---|
| 1,378,886 | Maineri | May 24, 1921 |
| 1,780,049 | Troyer | Oct. 28, 1930 |
| 1,799,912 | Laencher | Apr. 17, 1931 |
| 1,885,874 | Thomas et al. | Nov. 1, 1932 |
| 2,577,084 | Laxo | Dec. 4, 1951 |
| 2,578,779 | Black | Dec. 18, 1951 |